United States Patent Office 2,950,316
Patented Aug. 23, 1960

2,950,316

PURIFICATION OF FUMARIC ACID

Elmer H. Dobratz, Clayton, Mo., assignor to Monsanto Chemical Company, St. Louis, Mo., a corporation of Delaware No Drawing. Filed Nov. 19, 1952, Ser. No. 321,507

8 Claims. (Cl. 260—537)

This invention relates to a method for purifying fumaric acid. This method has particular application for effecting a substantial purification of crude fumaric acid produced by the isomerization of crude maleic acid obtained from a process for the manufacture of maleic anhydride by the catalytic oxidation of various hydrocarbons such as butadiene, benzene, toluene, or naphthalene.

There are several sources of crude maleic acid in such process for the manufacture of maleic anhydride by the catalytic oxidation of particular hydrocarbons. For example, when maleic anhydride is commercially produced by the catalytic oxidation of benzene or toluene, the gases from the catalytic converters are scrubbed with water to form an aqueous solution of crude maleic acid. In the manufacture of phthalic anhydride such as by the controlled catalytic oxidation of naphthalene a certain amount of maleic anhydride is formed as a co-product. The phthalic anhydride is condensed from the gas stream from the catalytic converters and the tail gases containing maleic anhydride are thereafter scrubbed with water to form an aqueous solution of crude maleic acid. These crude maleic acid solutions are thereafter dehydrated to obtain crude maleic anhydride which is subjected to various purification steps including fractionation to obtain the purified maleic anhydride product. During the various steps in these dehydration operations other aqueous liquors and condensates are formed containing crude maleic acid in various concentrations.

Fumaric acid is generally commercially produced by subjecting an aqueous solution of maleic acid to a catalytic isomerization process. A commonly used catalyst is hydrochloric acid and the isomerization is generally carried out by the heating of an aqueous solution of maleic acid and hydrochloric acid catalyst in the proper proportions. As the isomerization progresses and fumaric acid is formed the fumaric acid crystallizes out of the reaction mixture due to its low solubility in the reaction mixture, and the fumaric acid crystals are subsequently separated, for example, by filtration or centrifuging.

In view of the fact that maleic acid is generally isomerized to fumaric acid in an aqueous reaction mixture the various liquors and condensates containing crude maleic acid such as are available from various operations in the production of maleic acid as have been described above appear to be excellent sources of aqueous maleic acid solutions for the manufacture of fumaric acid by subjecting these aqueous maleic acid liquors and condensates directly to a catalytic isomerization operation, with no other treatment of these crude maleic acid solutions than adjusting the maleic acid concentration to an optimum value for catalytic isomerization. However, when fumaric acid is produced directly from such crude maleic acid solutions, the product fumaric acid is generally of poor quality, the color of such fumaric acid varying from a dirty gray to tan color rather than the desired and required light colored or substantially white product.

The poor quality fumaric acid which is produced by the isomerization of the maleic acid contained in such crude maleic acid solutions is very difficult to purify, for example, recrystallization of such impure fumaric acid from water results in little improvement in the quality of the fumaric acid. Various methods have been tried for inactivating or removing the contaminants and impurities in the crude maleic acid liquors in order to improve their quality for use in fumaric acid processes so that a high quality fumaric acid could be obtained directly from these liquors. However, most of these processes have proved to be only partially effective or the chemicals involved for treatment so expensive as to render them impractical.

It is an object of this invention to provide a method for effecting substantial purification of crude fumaric acid. It is a further object of this invention to provide a method for separating fumaric acid from the contaminants and impurities contained in crude maleic acid from which the fumaric acid is made, particularly where the source of the crude maleic acid is a crude maleic acid solution obtained from a process for the manufacture of maleic anhydride by the catalytic oxidation of hydrocarbons such as benzene, toluene, naphthalene, etc.

According to this invention, crude fumaric acid, particularly crude fumaric acid obtained by the isomerization of maleic acid, can be greatly improved in quality by converting the fumaric acid into an aqueous solution of its alkali metal acid salt, filtering this solution, and treating the filtrate with a strong acid to convert the alkali metal acid fumarate back to fumaric acid which is then recovered as a crystalline material of substantially improved quality.

Fumaric acid is normally a crystalline material having a very low solubility in water and acidic aqueous media. However, an alkali metal acid fumarate, such as sodium acid fumarate or potassium acid fumarate, is readily soluble in water or an aqueous medium having a pH in the range of 2.8 to 5. I have also found that while the alkali metal acid fumarates are soluble under these conditions, particularly the sodium acid fumarate, a major proportion of the contaminants and impurities originally present in the crude fumaric acid are substantially insoluble under these same conditions, and these impurities can be separated from the solution of the alkali metal acid fumarate by filtration. In using the term filtering or filtration, I mean to include not only the separation of solid materials from liquids by passing the liquid through a porous medium, but also equivalent methods of separating solids from liquids such as centrifuging.

In the practice of this invention, it is preferred to convert the crude fumaric acid to an aqueous solution of sodium acid fumarate by first preparing a slurry of the crude fumaric acid in water, heating this slurry to a temperature of the order of 75° C. and then adding sufficient concentrated sodium hydroxide solution to dissolve the fumaric acid and to bring the pH of the aqueous solution to within the range of 2.8 to 5, at which time the fumaric acid has been converted to a solution of predominantly sodium acid fumarate. Thereafter, this solution of sodium acid fumarate is maintained at a temperature within the range of about 75° C. to the boiling temperature of the solution for a short period of time, for example, about 15 minutes. Upon filtering this solution, preferably while the solution is at a temperature of about 75° C. or above, the insoluble impurities, representing a major proportion of the contaminants and impurities originally present in the crude fumaric acid are removed.

Thereafter when the filtrate containing the sodium acid fumarate is acidified with a strong acid, preferably a strong inorganic acid, such as concentrated hydrochloric acid, to pH 1, fumaric acid is precipitated as a crystalline material which is recovered from the liquor, cooled to room temperature, by filtration, washed with water and dried. The thus recovered fumaric acid is of greatly improved quality, as a major proportion of the impurities originally contained in the crude fumaric acid are effectively separated by this procedure. Still further improvement in the final quality of the fumaric acid can be effected by contacting the aqueous solution of the alkali metal acid fumarate with an active adsorption agent such as activated charcoal, prior to the filtration step while the solution is at a temperature of about 75° C. to remove the insoluble impurities. Where the active adsorption agent has also been used, certain other soluble impurities are removed whereby the reprecipitated fumaric acid is substantially white and of a very high quality.

Example I

The substantial improvement in quality which may be achieved by the practice of this invention is shown by the following example wherein a very light colored good quality fumaric acid was prepared from a poor quality dirty gray crude fumaric acid made by the catalytic isomerization of a crude maleic acid solution obtained from a commercial process for the manufacture of maleic anhydride by the catalytic oxidation of benzene. 96.8 grams of this crude fumaric acid was slurried into 500 ml. of water. The slurry was heated to about 75° C. and a sufficient quantity of 50% sodium hydroxide solution was added to dissolve the fumaric acid and to bring the pH of the aqueous solution to within the range of 2.8 to 5, whereby the fumaric acid was converted to a solution of predominantly sodium acid fumarate. This solution was then heated to boiling (about 100° C.) and refluxed for 15 minutes. Thereafter the solution was cooled to about 75° C. and filtered through a filter which had been precoated with a filter aid. The filtrate was then acidified with concentrated hydrochloric acid to pH 1 whereupon the fumaric acid precipitated out of the solution as fine white crystals. After cooling to 25° C., the crystalline fumaric acid was recovered by filtration, washed with water and dried. The recovered fumaric acid was light colored, of good quality and represented about 93% of the weight of the crude fumaric acid.

Example II

The above example was repeated, except however that after the solution of the sodium acid fumarate had been refluxed for 15 minutes and cooled to 75° C., the solution was then contacted with activated charcoal as the active adsorption agent and thereafter the solution was stirred with the activated charcoal for about 10 minutes at 75° C. and filtered at this temperature through a filter medium pre-coated with a filter aid. This filtrate was then acidified with concentrated hydrochloric acid to pH 1 whereby the fumaric acid precipitated as fine white crystals. After cooling to 25° C. the fumaric acid crystals were recovered from the acidified filtrate by filtration, washed with water and dried. The recovered and purified fumaric acid was essentially white, of very high quality and was recovered in a quantity equivalent to about 93% of the weight of the crude fumaric acid.

What is claimed is:

1. A method for purifying crude fumaric acid comprising converting the fumaric acid into an aqueous solution of an alkali metal acid salt of fumaric acid, separating insoluble materials from said solution, acidifying the said solution with a strong acid to precipitate fumaric acid crystals and recovering relatively pure fumaric acid.

2. A method for purifying crude fumaric acid comprising converting the fumaric acid into an aqueous solution of sodium acid fumarate, filtering this said solution, acidifying the filtered solution with hydrochloric acid to precipitate fumaric acid crystals and recovering the relatively pure fumaric acid.

3. A method for purifying crude fumaric acid comprising converting the fumaric acid into an aqueous solution of sodium acid fumarate having a pH of 2.8–5, filtering said solution, acidifying the filtered solution with hydrochloric acid to about pH 1 to precipitate fumaric acid and recovering the relatively pure fumaric acid.

4. A method for purifying crude fumaric acid obtained by the catalytic isomerization of crude maleic acid formed in a process for the manufacture of maleic anhydride by the catalytic oxidation of a substance selected from the group consisting of benzene, toluene and naphthalene, comprising heating a slurry of crude fumaric acid in water to a temperature of the order of 75° C., adding a sufficient quantity of sodium hydroxide to the heated slurry to convert the fumaric acid to sodium acid fumarate and bring the solution to a pH of 2.8 to 5, filtering the heated solution, acidifying the filtered solution with hydrochloric acid to about pH 1 to precipitate fumaric acid and recovering the purified fumaric acid.

5. The method of claim 5 wherein the solution of sodium acid fumarate is contacted with an activated charcoal prior to filtration.

6. A method for purifying crude fumaric acid comprising adding sufficient alkali metal hydroxide to an aqueous slurry of crude fumaric acid to dissolve the fumaric acid as the alkali metal acid salt, and bring the aqueous solution to a pH of 2.8–5, separating insoluble materials from the aqueous solution, acidifying the aqueous solution with a strong acid to precipitate fumaric acid and recovering the fumaric acid of improved purity.

7. A method for purifying crude fumaric acid comprising adding sufficient sodium hydroxide to an aqueous slurry of crude fumaric acid to dissolve the fumaric acid as sodium acid fumarate, and bring the aqueous solution to a pH of 2.8–5, separating insoluble materials from the aqueous solution, acidifying the aqueous solution with hydrochloric acid to about pH 1 to precipitate fumaric acid and recovering the fumaric acid of improved purity.

8. The method of claim 7 wherein the solution of sodium acid fumarate is contacted with an activated charcoal prior to filtration.

References Cited in the file of this patent

UNITED STATES PATENTS

| 1,945,246 | Witzel | Jan. 30, 1934 |
| 2,393,352 | Winstrom | Jan. 22, 1946 |
| 2,494,049 | Levin | Jan. 10, 1950 |
| 2,516,126 | Lauer et al. | July 25, 1950 |
| 2,516,127 | Lauer et al. | July 25, 1950 |

UNITED STATES PATENT OFFICE

CERTIFICATE OF CORRECTION

Patent No. 2,950,316            August 23, 1960

Elmer H. Dobratz

It is hereby certified that error appears in the printed specification of the above numbered patent requiring correction and that the said Letters Patent should read as corrected below.

Column 3, line 21, strike out "a"; column 4, line 35, for the claim reference numeral "5" read -- 4 --.

Signed and sealed this 4th day of April 1961.

(SEAL)
Attest: ERNEST W. SWIDER
Attesting Officer

ARTHUR W. CROCKER
Acting Commissioner of Patents